United States Patent
Blanford et al.

(10) Patent No.: US 7,070,108 B1
(45) Date of Patent: Jul. 4, 2006

(54) BAR CODE SCANNER

(75) Inventors: Denis M. Blanford, Duluth, GA (US); Deborah A. Detwiler, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/320,593

(22) Filed: Dec. 16, 2002

(51) Int. Cl.
*G02B 26/10* (2006.01)

(52) U.S. Cl. ............................ 235/462.25; 235/462.01; 235/462.09

(58) Field of Classification Search ........... 235/462.01, 235/462.07, 462.08, 462.15, 462.25, 462.09, 235/462.12
See application file for complete search history.

(56) References Cited

U.S. PATENT DOCUMENTS

| | | | | |
|---|---|---|---|---|
| 4,825,058 A * | 4/1989 | Poland | ................... | 235/462.01 |
| 5,455,414 A * | 10/1995 | Wang | ...................... | 235/462.1 |
| 5,481,098 A * | 1/1996 | Davis et al. | ........... | 235/462.07 |
| 5,686,715 A * | 11/1997 | Watanabe et al. | ........... | 235/436 |
| 5,821,520 A * | 10/1998 | Mulla et al. | ........... | 235/462.27 |
| 6,024,289 A * | 2/2000 | Ackley | ........................ | 235/494 |
| 6,095,419 A * | 8/2000 | Watanabe et al. | ...... | 235/462.02 |
| 6,095,422 A * | 8/2000 | Ogami | .................. | 235/462.27 |
| 6,098,892 A * | 8/2000 | Peoples, Jr. | .................. | 235/494 |
| 6,119,941 A * | 9/2000 | Katsandres et al. | .... | 235/462.07 |
| 6,243,447 B1 * | 6/2001 | Swartz et al. | ............ | 379/93.12 |
| 6,321,987 B1 * | 11/2001 | Watanabe et al. | ...... | 235/462.02 |
| 6,405,925 B1 * | 6/2002 | He et al. | ................ | 235/462.25 |
| 6,565,004 B1 * | 5/2003 | Ishii et al. | ............. | 235/462.25 |
| 6,585,157 B1 * | 7/2003 | Brandt et al. | .......... | 235/462.07 |
| 6,631,843 B1 * | 10/2003 | Schuessler | ............. | 235/462.07 |
| 6,687,346 B1 * | 2/2004 | Swartz et al. | ............ | 379/93.12 |
| 6,722,568 B1 * | 4/2004 | Blanford et al. | ....... | 235/462.11 |

* cited by examiner

*Primary Examiner*—Ahshik Kim
(74) *Attorney, Agent, or Firm*—Paul W. Martin; Charles Maney

(57) ABSTRACT

A bar code scanner is disclosed, which is arranged to operate in both a first mode, and a second mode. In said first mode a limited number of bar code symbologies or types are read, as part of the scanning process. In said second mode, at least, one additional bar code symbology is read, as part of the scanning process.

36 Claims, 1 Drawing Sheet

BAR CODE SCANNER

The present invention relates generally to bar code scanners and, more specifically, to scanning bar codes.

BACKGROUND OF THE INVENTION

Conventional bar codes have varying width bars and spaces suitably printed on a label. The bar code may take any conventional form in one or more dimensions, and includes, for example, the typical one-dimensional UPC form. The UPC symbology is based on a specification enacted by the Uniform Product Code Council, Inc. of Dayton Ohio. The typical UPC bar code includes a series or sequence of alternating dark bars and light spaces of varying widths. The bars and spaces are arranged in groups representing individual characters. The bar code starts with a left margin character and ends with a right margin character, and has a center reference character as well, with the characters provided there between representing any desired data.

The minimum width of either a bar or space in the UPC symbology is defined as a single module, which represents a unit width. The width of a single character coded using the UPC symbology is seven (7) modules. A seven module UPC character has two bar and two space elements which have varying widths to differentiate between the respective characters.

There are many types of bar code symbologies (encoding schemes). For example, there are a number of different one-dimensional bar code symbologies. These symbologies include UPC/EAN, Code 39, Code 128, Codabar and Interleaved 2 of 5. There are also 2 dimensional bar code symbologies.

Generally, bar code scanners are programmed to read only the bar code types that are currently being used in the system. This is done to increase decoding accuracy and allow the bar code scanner the maximum processing power to decode the bar codes that do exist in the system.

Occasionally, a new type of bar code is introduced into the system, such as, Interleaved 2 of 5, or some other bar code symbology. The scanner operator or scanner service personnel may not have the capability to discern the bar code symbology and other, significant details of the new bar code. Therefore, the operator or service personnel lack the ability to program the scanner to read this new bar code type. Accordingly, this can result in delays at checkouts as a more experienced operator or engineer may be required to program the scanner, before the new bar code in question can be read.

It is an object of the present invention to provide a bar code scanner, which can be utilized by an untrained operator to scan regularly used bar codes and those which are new or are infrequently used by a system.

It is a further object of the present invention to enable the introduction of new types of bar code into a bar code system when the operator does not know the details of the bar code, such as the bar code symbology or type, or bar code length, etc.

It is yet a further object of the present invention to produce a bar code scanner, which obviates the problems discussed above.

SUMMARY OF THE INVENTION

According to a first aspect of the present invention there is provided a bar code scanner arranged to operate in both a first mode, in which a limited number of bar code symbologies or types are read, as part of the scanning process, and a second mode, in which, at least, one additional bar code symbology is read, as part of the scanning process.

According to a second aspect of the present invention there is provided a method of scanning a bar code utilizing both a first mode, in which a limited number of bar code symbologies or types are read, as part of the scanning process, and a second mode, in which, at least, one additional bar code symbology is read, as part of the scanning process.

The invention, in accordance with preferred and exemplary embodiments, together with further objects and advantages thereof, is more particularly described in the following detailed description taken in conjunction with the accompanying drawing.

DESCRIPTION OF THE PREFERRED EMBODIMENT

Figure 1:
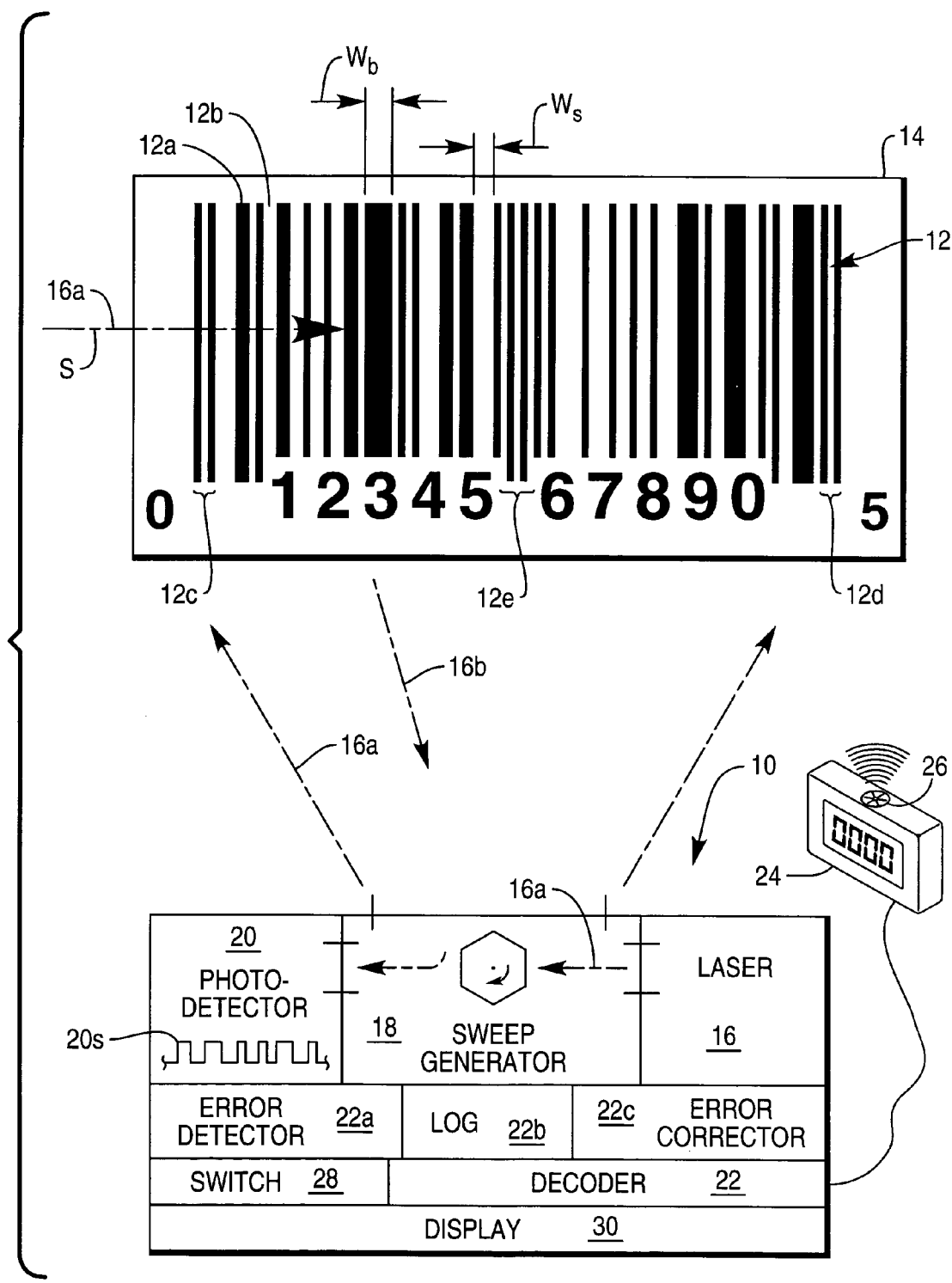
FIG. 1 is a schematic representation of a bar code and scanner in accordance with the present invention.

Illustrated schematically in FIG. 1 is a laser bar code scanner 10 for scanning and decoding a conventional bar code 12 printed on a suitable label 14. The bar code 12 may take any conventional form in one or more dimensions including the conventional one-dimensional UPC symbology illustrated. The exemplary bar code 12 illustrated in FIG. 1 includes a plurality of sequential or alternating dark bars 12a and white spaces 12b, which are straight and parallel to each other and have corresponding varying widths $W_b$ and $W_s$. The bars and spaces are arranged in a plurality of sequential groups defining respective characters of equal width. The minimum width of a bar or a space is defined as the minimum width module, and in the UPC symbology must exceed 8 mils by specification. A single UPC character is defined as having two bars 12a and two spaces 12b of varying widths. And, the specified widths of a single character coded using the UPC symbology must, by specification, be seven modules. Furthermore, the UPC symbology defines the maximum bar width as being four modules.

In the exemplary bar code 12 illustrated in FIG. 1, the bar code conventionally starts with a left margin character 12c, ends with a right margin character 12d, and has a center reference character 12d, with the remaining bars and spaces there between defining desired data characters. As indicated above, each of the data characters has a total width of seven modules and includes two bars and two spaces.

The exemplary scanner 10 illustrated in FIG. 1 includes conventional means for optically scanning the bar code 12 sequentially across the bars and spaces 12a,b over the total width of the bar code 12 from the left margin character 12c to the right margin character 12d. In the preferred embodiment illustrated, scanning is accomplished by using a conventional laser 16 which emits a suitable laser beam 16a which is suitably scanned across the face of the bar code 12 by a conventional sweep generator 18 which may take the form of a rotating multifaceted mirror. The laser beam 16a is scanned transversely across the bar code 12 in a scan direction S so that back scattered light 16b reflects off the bars and spaces back to the scanner. Since the bars 12a are dark, very little light is back scattered therefrom, whereas the spaces 12b are substantially white and more effectively back scatter light to the scanner.

A conventional photodetector 20 is provided in the scanner 10 and is suitably optically aligned therein for receiving the back scattered light 16b and producing an electrical bar code signature 20s alternating in intensity between maximum and minimum values corresponding with the back scattered light 16b from the spaces 12b and bars 12a, respectively. The time duration of the maximum and minimum intensity portions of the signature 20s corresponds with the varying widths of the bars and spaces. Since the scan beam 16a is scanned across the bar code 12 at a known and constant rate of speed, the bar code signature 20s is representative of the bar code 12 itself and may be decoded in a conventional decoder 22 specifically configured for the corresponding bar code symbology printed on the label 14.

The decoder 22 may take any conventional form and is typically a digitally programmable microprocessor containing suitable software for analyzing the bar code signature 20s and decoding the data contained therein. The scanner 10 is electrically joined to a suitable display 24 which may be used for displaying certain information encoded in the bar code 12, such as the price of a consumer product represented thereby. When the bar code 12 is accurately scanned and decoded, the data may be presented on the display 24, and a small speaker 26 operatively joined to the scanner 10 may beep to indicate successful decoding of the bar code 12.

However, if the scanner 10 is unable to decode the bar code 12, the speaker 26 will not beep and the display 24 will remain blank. Multiple passes of the bar code 12 over the scanner 10 may be attempted in order to properly read the label if possible, or if the bar code 12 is defective it cannot be read.

A probable cause of the scanner not reading or decoding the bar code correctly is that the bar code has a symbology that is not on the list of symbologies that the scanner uses during normal operation. If so the scanner may be switched to a second mode of operation, in which all symbologies known to the scanner are checked for. The scanner can be switched between the normal or first mode of operation and the second or universal mode in a number of different ways. For example, the operator or service personnel could scan a special bar code, press a switch 28 on the bar code scanner, press a key on a point of sale terminal (not shown) connected to the scanner, or any other means to communicate to the bar code scanner a command to initiate the second mode of operation, in which the scanner is enabled to read any bar code symbology that the scanner is capable of decoding.

The operator or service personnel would then scan the new bar code, which the scanner would then decode and, subsequently, inform the operator/service personnel of the bar code symbology and other pertinent details, such as, bar code length, etc. Multiple methods of informing the operator/service personnel of the bar code details could be used in one or more combinations and could include operator or customer displays 30, speech from the scanner, speech from a point of sale terminal, printer output or any other method of communication known to a person skilled in the art. The operator/service personnel can then utilize that information to program the scanner to enable the decoding of that bar code type in the normal scanning mode. In other words if a bar code type is detected in the second mode of operation of the scanner, the scanner can be programmed to look for that symbology in the first or normal mode of operation from then on.

Alternatively, a different special bar code or command could be input into the bar code scanner to allow the bar code scanner not only to detect and communicate the new bar code type but would also allow the bar code scanner to program itself to be capable of scanning the new bar code type in the normal scanning mode. For example, if a new bar code can not be read by the scanner the scanner can be arranged to automatically review all of the symbologies with which it has been programmed and if the symbology of the bar code in question is found the bar code is read. The scanner may now also check for the new symbology during each scan operation thereafter. Alternatively, the scanner may then revert to its normal operation while logging the fact that the new symbology has been detected. The scanner may be required to detect the new bar code symbology a predetermined number of times before it looks for that symbology as part of its normal scanning operation.

Also, if a symbology has not been detected over a predetermined number of scan operations that symbology may be moved, either automatically, or via operator input, from the first mode to the second mode.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A bar code scanner operating in both a first mode, in which the scanner is enabled to read a limited number of different bar code symbologies or types representing a subset of all bar code symbologies that the scanner is capable of decoding, as part of a scanning process, and a second mode in which the scanner is enabled to read all bar code symbologies that the scanner is capable of decoding, as part of the scanning process, the second mode being invoked when the scanner operating in the first mode has failed to read a bar code, the scanner being further enabled to indicate bar code symbologies successfully decoded during operation in the second mode.

2. The bar code scanner of claim 1, adapted such that a bar code symbology can be added to or removed from the limited number of bar code symbologies read in the first mode of operation.

3. The bar code scanner of claim 2, adapted such that a bar code symbology detected during operation of the scanner in the second mode of operation is added to the limited number of bar code symbologies read in the first mode of operation when detected by the scanner.

4. The bar code scanner of claim 3, adapted to add a symbology to or remove the symbology from the limited number of bar code symbologies read in the first mode of operation automatically.

5. The bar code scanner of claim 4, adapted such that a symbology is added to the limited number of bar code symbologies read in the first mode of operation only when detected a predetermined number of times during scanning operations.

6. The bar code scanner of claim 3, wherein the symbology is added to the limited number of bar code symbologies read in the first mode upon a command by a scanner operator.

7. The bar code scanner of claim 1, adapted for manual switching between the first and second modes of operation, upon a command by a scanner operator.

8. The bar code scanner of claim 7, wherein the switching between the modes is actuated by scanning a predesignated bar code.

9. The bar code scanner of claim 7, wherein the switching between the modes is actuated by utilizing a switch on the scanner.

10. The bar code scanner of claim 7, further comprising a display operative to indicate to the operator the bar code symbology detected during scanning.

11. The bar code scanner of claim 1, wherein the scanner is adapted to switch between the first and second modes of operation automatically, when a bar code can not be read when the scanner is in the first mode of operation.

12. The bar code scanner of claim 1, adapted to log the number of times scanning is undertaken without detecting particular bar codes and wherein a bar code symbology which has not been detected in a predetermined number of scanning operations is removed from the limited number of bar code symbologies read in the first mode.

13. The bar code scanner of claim 12, further comprising means of informing the operator that a bar code symbology has not been detected in a predetermined number of scans and the operator is asked to confirm that the symbology is to be removed from the limited number of bar code symbologies read in the first mode.

14. The bar code scanner of claim 12, operative to automatically remove the bar code symbology not detected in a predetermined number of scans from the limited number of bar code symbologies read in the first mode.

15. A method of scanning a bar code, comprising:
setting a scanner to a first mode, in which the scanner is enabled to read a limited number of different bar code symbologies or types representing a subset of all the symbologies or types that the scanner is capable of decoding, as part of a scanning process; and
upon failure of the scanner to read a bar code when operating in the first mode, setting the scanner to a second mode, in which the scanner is enabled to read all symbologies that the scanner is capable of decoding, as part of the scanning has process, the scanner being further enabled to indicate bar code symbologies successfully decoded during operation in the second mode.

16. The method of claim 15, wherein a bar code symbology can be added to or removed from the limited number of bar code symbologies read in the first mode of operation.

17. The method of claim 16, wherein a bar code symbology is added to the limited number of bar code symbologies read in the first mode of operation upon detection during operation of the scanner in the second mode.

18. The method of claim 17, wherein the symbology is added automatically.

19. The method of claim 18, adapted such that a symbology is added to the limited number of bar code symbologies read in the first mode of operation only when detected a predetermined number of times during a scanning operation.

20. The method of claim 17, wherein the symbology is added to the limited number of bar code symbologies read in the first mode of operation upon a command by a scanner operator.

21. The method of claim 15, wherein switching between the first and second modes of operation is actuated upon a command by a scanner operator.

22. The method of claim 21, wherein the switching between the modes is actuated by scanning a predesignated bar code.

23. The method of claim 21, wherein the switching between the modes is actuated by utilizing a switch on the scanner.

24. The method of claim 21, further comprising displaying to the operator the bar code symbology detected during scanning.

25. The method of claim 15, wherein switching between the first and second modes of operation is accomplished automatically, when a bar code can not be read.

26. The method of claim 15, wherein a bar code symbology which has not been detected in a predetermined number of scanning operations is removed from the limited number of bar code symbologies read in the first mode of operation.

27. The method of claim 26, wherein the operator is informed that a bar code symbology has not been detected in a predetermined number of scans and the operator is asked to confirm that the symbology is to be removed from the limited number of bar code symbologies read in the first mode of operation.

28. The method of claim 26, wherein the symbology is removed from the limited number of bar code symbologies read in the first mode of operation automatically.

29. A bar code scanner operating in both a first mode, in which the scanner is enabled to read a limited number of bar code symbologies or types representing a subset of all bar code symbologies that the scanner is capable of decoding, as part of a scanning process, and a second mode in which the scanner is enabled to read all bar code symbologies that the scanner is capable of decoding, as part of the scanning process, the second mode being invoked when the scanner operating in the first mode has failed to read a bar code, the scanner being further enabled to indicate bar code symbologies successfully decoded during operation in the second mode;
in which the scanner is adapted such that a bar code symbology can be added to or removed from the limited number of bar code symbologies read in the first mode of operation; and
in which the scanner is adapted such that a bar code symbology detected during operation of the scanner in the second mode of operation is added to the limited number of bar code symbologies read in the first mode of operation when detected by the scanner.

30. The bar code scanner of claim 29, adapted to add a symbology to or remove the symbology from the limited number of bar code symbologies read in the first mode of operation automatically.

31. The bar code scanner of claim 30, adapted such that a symbology is added to the limited number of bar code symbologies read in the first mode of operation only when detected a predetermined number of times during scanning operations.

32. The bar code scanner of claim 29, wherein the symbology is added to the limited number of bar code symbologies read in the first mode upon a command by a scanner operator.

33. A method of scanning a bar code, comprising:
setting a scanner to a first mode, in which the scanner is enabled to read a limited number of bar code symbologies or types representing a subset of all the symbologies or types that the scanner is capable of decoding, as part of a scanning process; and
upon failure of the scanner to read a bar code when operating in the first mode, setting the scanner to a second mode, in which the scanner is enabled to read all symbologies that the scanner is capable of decoding, as part of the scanning has process, the scanner being further enabled to indicate bar code symbologies successfully decoded during operation in the second mode;
wherein a bar code symbology can be added to or removed from the limited number of bar code symbologies read in the first mode of operation; and
wherein a bar code symbology is added to the limited number of bar code symbologies read in the first mode of operation upon detection during operation of the scanner in the second mode.

34. The method of claim 33, wherein the symbology is added automatically.

35. The method of claim 34, adapted such that a symbology is added to the limited number of bar code symbologies read in the first mode of operation only when detected a predetermined number of times during a scanning operation.

36. The method of claim 33, wherein the symbology is added to the limited number of bar code symbologies read in the first mode of operation upon a command by a scanner operator.

* * * * *